United States Patent
George et al.

(10) Patent No.: US 10,178,358 B2
(45) Date of Patent: Jan. 8, 2019

(54) METHOD FOR SURVEILLANCE OF AN AREA OF INTEREST AND A SURVEILLANCE DEVICE THEREOF

(71) Applicant: Wipro Limited, Bangalore (IN)

(72) Inventors: Tomson Ganapathiplackal George, Paika (IN); Sudheesh Joseph, Kochi (IN)

(73) Assignee: Wipro Limited, Bangalore (IN)

( * ) Notice: Subject to any disclaimer, the term of this patent is extended or adjusted under 35 U.S.C. 154(b) by 186 days.

(21) Appl. No.: 15/054,165

(22) Filed: Feb. 26, 2016

(65) Prior Publication Data

US 2017/0208295 A1    Jul. 20, 2017

(30) Foreign Application Priority Data

Jan. 14, 2016  (IN) .............................. 201641001481

(51) Int. Cl.
| | |
|---|---|
| *H04N 7/18* | (2006.01) |
| *G06T 17/00* | (2006.01) |
| *G08B 13/196* | (2006.01) |
| *H04N 5/247* | (2006.01) |

(52) U.S. Cl.
CPC ............ *H04N 7/188* (2013.01); *G06T 17/00* (2013.01); *G08B 13/19608* (2013.01); *G08B 13/19641* (2013.01); *H04N 7/181* (2013.01); *G06T 2200/04* (2013.01); *G06T 2207/30232* (2013.01); *H04N 5/247* (2013.01)

(58) Field of Classification Search
CPC .................. G06T 17/00; G06T 2200/04; G06T 2207/30232; H04N 7/188

USPC ......................................................... 348/143
See application file for complete search history.

(56) References Cited

U.S. PATENT DOCUMENTS

| | | | |
|---|---|---|---|
| 5,872,594 A * | 2/1999 | Thompson .............. | H04N 5/232 348/143 |
| 8,811,692 B2 * | 8/2014 | Prokoski .............. | A61B 5/0064 382/128 |
| 9,400,503 B2 * | 7/2016 | Kearns ................... | B25J 11/009 |

(Continued)

OTHER PUBLICATIONS

Frey et al, Grouping Crown-Sourced Mobile Videos for Cross-Camera Tracking (Year: 2013).*

(Continued)

*Primary Examiner* — Shan E Elahi
(74) *Attorney, Agent, or Firm* — Finnegan, Henderson, Farabow, Garret & Dunner L.L.P.

(57) ABSTRACT

The present disclosure relates to a method for surveillance an area of interest. A surveillance device pre-sets an area of interest for each of plurality of image capturing devices. The surveillance device synchronizes the plurality of image capturing devices to simultaneously observe the area of interest. Upon synchronizing, the surveillance device continuously receives view port details from each of the plurality of image capturing devices. If the received view port details matches with pre-set view port details of the area of interest, then one or more images are captured at the intersection of field of view of plurality of image capturing devices. The captured images are provided to the surveillance device to generate a 3-D model. The 3-D model is observed for detecting presence or absence of a new element in the area of interest.

15 Claims, 6 Drawing Sheets

(56) References Cited

U.S. PATENT DOCUMENTS

| | | | | |
|---|---|---|---|---|
| 2012/0069131 A1* | 3/2012 | Abelow | ............... | G06Q 10/067 |
| | | | | 348/14.01 |
| 2013/0127980 A1* | 5/2013 | Haddick | ................. | G06F 3/013 |
| | | | | 348/14.08 |
| 2013/0141543 A1* | 6/2013 | Choi | ..................... | H04N 7/181 |
| | | | | 348/47 |
| 2013/0218024 A1* | 8/2013 | Boctor | ................. | A61B 8/0841 |
| | | | | 600/476 |
| 2013/0278631 A1* | 10/2013 | Border | ................. | G02B 27/017 |
| | | | | 345/633 |
| 2015/0208058 A1* | 7/2015 | Denizot | ........... | G08B 13/19608 |
| | | | | 348/47 |
| 2015/0381944 A1* | 12/2015 | Renkis | ................... | H04N 7/181 |
| | | | | 348/48 |
| 2015/0381947 A1* | 12/2015 | Renkis | ................... | H04N 7/181 |
| | | | | 348/159 |
| 2016/0086108 A1* | 3/2016 | Abelow | ............... | G06Q 10/067 |
| | | | | 705/7.29 |
| 2016/0210602 A1* | 7/2016 | Siddique | ............ | G06Q 20/0453 |
| 2016/0267759 A1* | 9/2016 | Kerzner | ........... | G08B 13/19645 |

OTHER PUBLICATIONS

Xu Yongzhe et al., "Multi Camera for Surveillance System Ground Detection and 3D Reconstruction", *International Journal of Smart Home*, vol. 9, No. 1 (2015), pp. 103-110.

\* cited by examiner

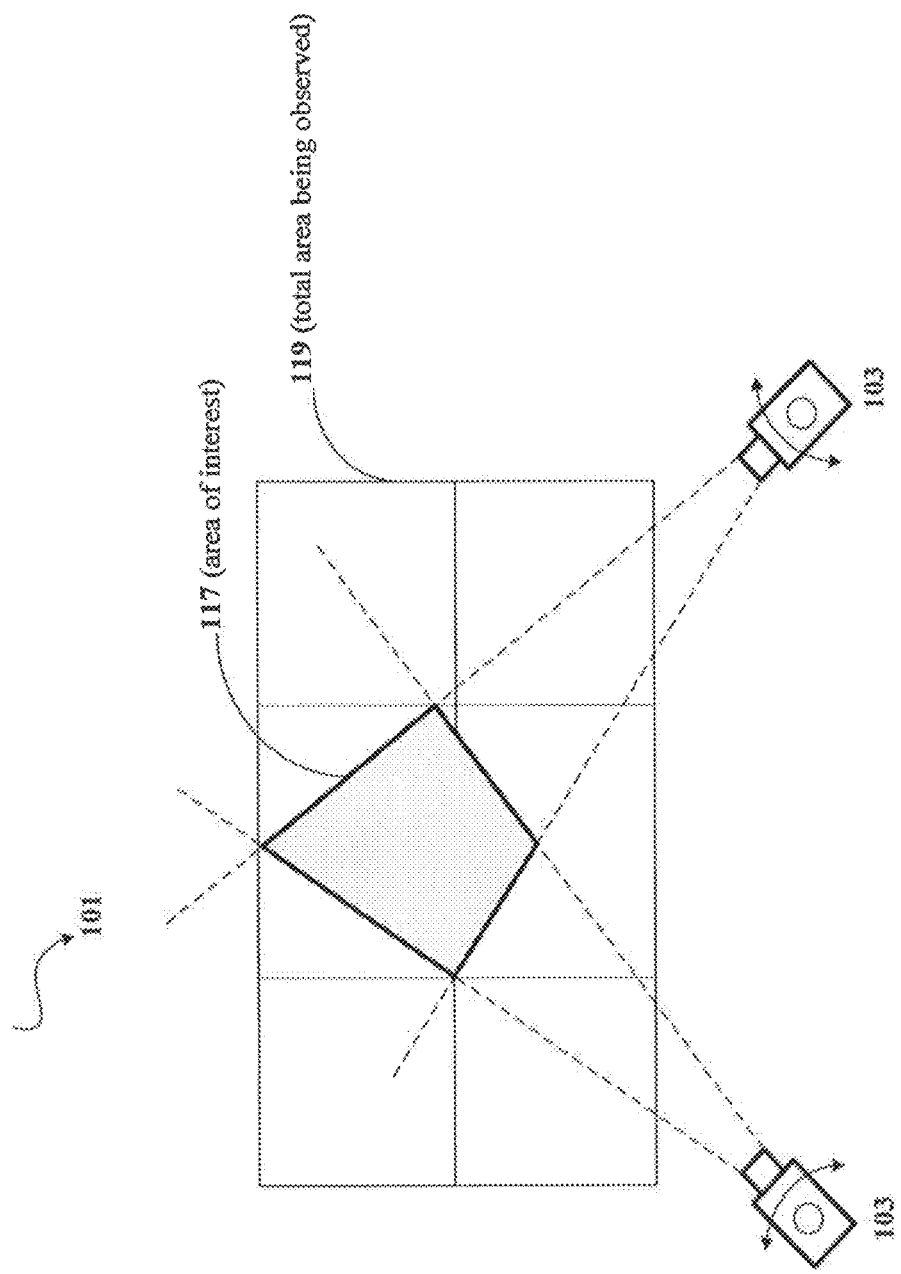

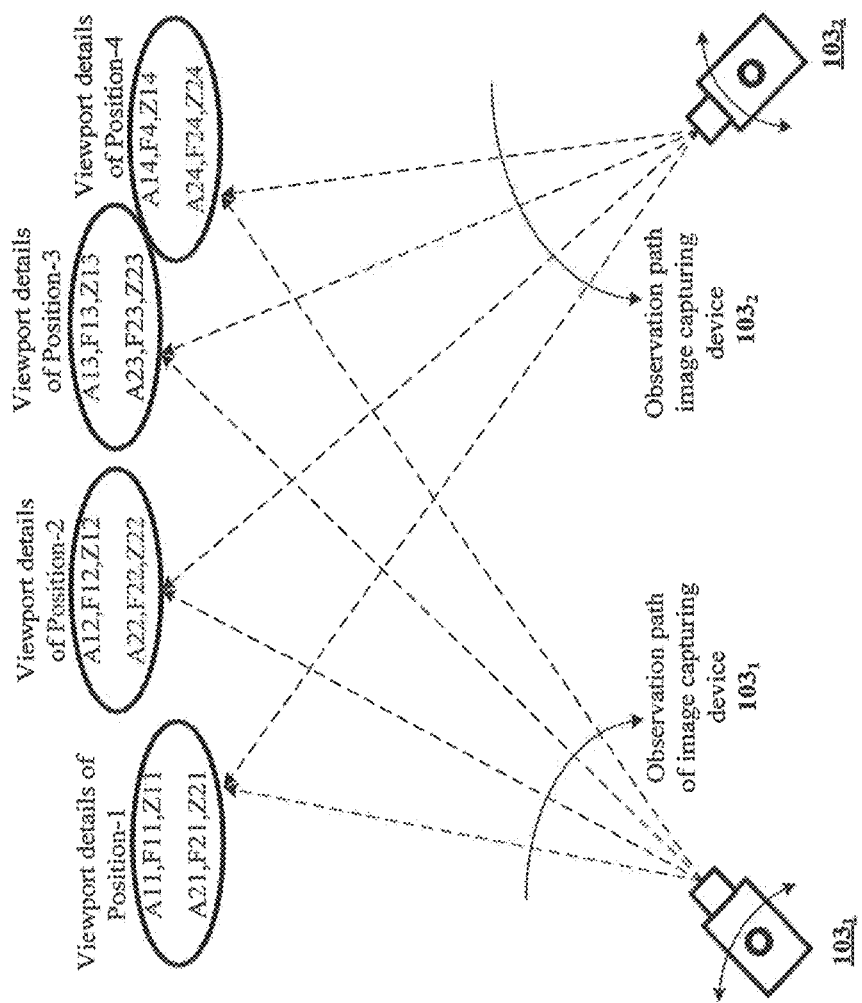

METHOD FOR SURVEILLANCE OF AN AREA OF INTEREST AND A SURVEILLANCE DEVICE THEREOF

TECHNICAL FIELD

The present subject matter is related, in general to image processing, and more particularly, but not exclusively to a method and a device, for surveillance of an area of interest.

BACKGROUND

Generally, surveillance is monitoring of behaviour, activities or other changing information, usually of people, for the purpose of influencing, managing, directing or protecting locality and people present in the locality. Surveillance is of major importance in any prominent location like an airport, a shopping mall, temples, technology parks etc. Surveillance cameras are used for the purpose of observing an area. The images captured by these cameras are analysed by a security personnel to detect suspicious events.

The existing systems use modern security cameras for detecting suspicious events/illicit activities. However, they do not have required intelligence and hence are not able to provide sufficient security for the area under surveillance. The existing systems are based on two dimensional models of the images captured by the cameras. A major shortcoming of such systems is a significant error in measuring depth of target and real size of the observed targets. Therefore, it is important to incorporate intelligence into camera based surveillance system which can raise alarms or provide appropriate feedback on the occurrence of any suspicious events.

Therefore, there is a need to find accurate depth of the target from the camera and detect position of an object of interest using a 3-dimensional model. Also, a solution to, improve accuracy of a security alert system by tracking the object of interest.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Disclosed herein are a method and a device for surveillance of an area of interest. Plurality of image capturing devices are associated with a surveillance device. Each of the plurality of image capturing devices capture one or more images at the intersection points of their field of views, while observing the same area of interest. The one or more images captured are provided to a surveillance device. A 3-D model is generated by the surveillance device combining the one or more images and presence or absence of a new element is detected in the 3-D model.

Accordingly, the present disclosure comprises a method for surveillance an area of interest. The method comprises synchronizing, by a surveillance device, plurality of image capturing devices to observe simultaneously, the area of interest. Thereafter, the surveillance device receives view port details of an area being observed by each of the plurality of image capturing devices. Further, the surveillance device obtains one or more images captured at intersection points of field of view of the plurality of image capturing devices, when the view port details received from each of the plurality of image capturing devices matches with pre-set view port details of the area of interest. Upon obtaining the one or more images, the surveillance device generates a 3-D model of the area of interest using the one or more images received from each of the plurality of image capturing device. Thereafter, the surveillance device observes the 3-D model for detecting at least one of presence and absence of a new element, in the area of interest.

Further, the present disclosure comprises a surveillance device for surveillance of an area of interest. The surveillance device comprises a processor and a memory communicatively coupled to the processor. The memory stores the processor-executable instructions, which, on execution, causes the processor to synchronize plurality of image capturing devices to observe simultaneously, the area of interest. Upon synchronizing the plurality of image capturing devices, the processor receives view port details of an area being observed by each of the plurality of image capturing devices. Further, the processor obtains one or more images captured at intersection points of field of view of the plurality of image capturing devices, when the view port details received from each of the plurality of image capturing devices matches with pre-set view port details of the area of interest. Thereafter, the processor generates a 3-D model of the area of interest using the one or more images received from each of the plurality of image capturing devices. Finally, the processor observes the 3-D model for detecting at least one of presence and absence of a new element, in the area of interest.

Further, the present disclosure relates to a non-transitory computer readable medium including instructions stored thereon that when processed by at least one processor causes a surveillance device to perform operations comprising synchronizing plurality of image capturing devices to observe simultaneously, the area of interest. The instructions further cause the processor to receive view port details of an area being observed by each of the plurality of image capturing devices. Thereafter, the instructions cause the processor to obtain one or more images captured at intersection points of field of view of the plurality of image capturing devices, when the view port details received from each of the plurality of image capturing devices matches with pre-set view port details of the area of interest. Further, the instructions cause the processor to generate a 3-D model of the area of interest using the one or more images received from each of the plurality of image capturing devices. Finally, the instructions cause the processor to observe the 3-D model for detecting at least one of presence and absence of a new element, in the area of interest.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 1b shows an exemplary illustration of intersection of field of views formed by two image capturing devices in accordance with some embodiments of the present disclosure;

FIG. 1c shows exemplary illustration of observation paths of two image capturing devices and the viewport details obtained due to the synchronized movement of both the image capturing devices in accordance with some embodiments of the present disclosure;

Figure 1A:
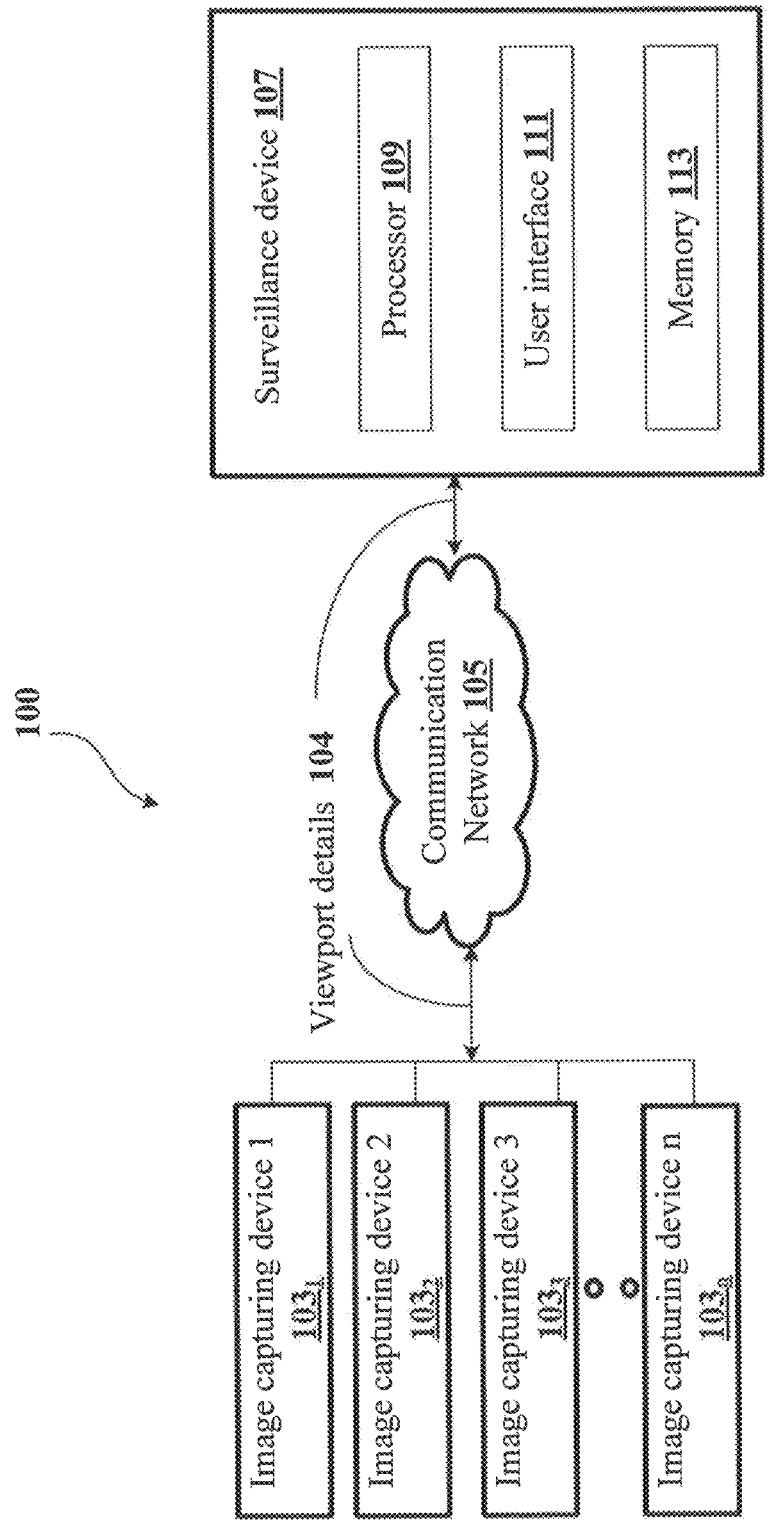
FIG. 1a shows an exemplary architecture for surveillance of an area of interest in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method for observing an area of interest. A surveillance device pre-sets an area of interest for each of plurality of image capturing devices. The surveillance device synchronizes the plurality of image capturing devices to simultaneously observe the area of interest. Upon synchronizing, the surveillance device continuously receives view port details from each of the plurality of image capturing devices. If the received view port details matches with pre-set view port details of the area of interest, then one or more images are captured at the intersection of field of view of plurality of image capturing devices. The one or more images captured are obtained by the surveillance device to generate a 3-D model of the area of interest. The 3-D model is observed for detecting presence or absence of a new element in the area of interest.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1a shows an exemplary architecture for surveillance an area of interest in accordance with some embodiments of the present disclosure.

The architecture 100 comprises plurality of image capturing devices, image capturing device 1 $103_1$ to image capturing device n $103_n$ (collectively referred to as plurality of image capturing devices 103), a communication network 105 and a surveillance device 107. As an example, the plurality of image capturing devices 103 may include, but not limited to, cameras. The communication network 105 may be at least one of wired communication network and wireless communication network.

The plurality of image capturing devices 103 may be configured for surveillance of an area of interest. The plurality of image capturing devices 103 continuously provides viewport details of the area being observed to the surveillance device 107 through the communication network 105. The viewport details may include information about the co-ordinates and the pixels of the area being observed by the plurality of image capturing devices 103. In an embodiment, the plurality of image capturing devices 103 may be rotating about an axis.

The surveillance device 107 comprises a processor 109, a user interface 111 and a memory 113. The area of interest to be observed from total area being observed by the plurality of image capturing devices 103 is pre-set for each of the plurality of image capturing devices 103 through the user interface 111. The movements of each of the plurality of image capturing devices 103 may be synchronized by the processor 109 to scan the same area of interest at the same time. The processor 109 continuously receives the viewport details 104 corresponding to the area being observed by each of the plurality of image capturing devices 103 from each of the plurality of image capturing devices 103.

The received viewport details 104 from each of the plurality of image capturing devices 103 may be stored in the memory 113. The received viewport details 104 from each of the plurality of image capturing devices 103 are compared with the pre-set viewport details of the area of interest, stored in the memory 113. If the received viewport details 104 from each of the plurality of image capturing devices 103 matches with the pre-set viewport details, then each of the plurality of image capturing devices 103 are said to be observing the same area of interest. Each of the plurality of image capturing devices 103 captures one or more images at the intersection points i.e. the one or more images of only the area of interest are captured, eliminating rest of the area.

The one or more images captured by each of the plurality of image capturing devices 103, are provided to the surveillance device 107. The processor 109 of the surveillance device 107 combines the received one or more images using one or more predefined techniques to generate a 3-D model of the area of interest. The one or more predefined techniques are stored in the memory 113. As an example, the one or more predefined techniques may include, but not limited to, a technique of estimating dense shape and non-Lambertian photometry.

Upon generating the 3-D model, the 3-D model is observed using the user interface 111 to detect presence or absence of a new element in the area of interest. If the presence of the new element is detected in the area of interest, movements or intrusions of the new element is tracked by the processor 109. Movement of the new element is tracked by redefining observing path of the plurality of image capturing devices 103. In an embodiment, redefining observing path may comprise adjusting one or more factors such as angle of rotation of the plurality of image capturing devices 103 with respect to the moving element focal length of the plurality of image capturing devices 103, zoom level of the plurality of the image capturing devices 103 etc. Security personnel proximal to the present position of the new element are alerted to perform one or more actions. As an example, the one or more actions may be attacking the new element, checking the new element to find any weapons or other related devices, interrogating the new element etc. In an embodiment, the new element is tracked until the new element moves out of the area of interest.

In an embodiment, the processor 109 is preconfigured to vary the resolution and compression of the plurality of image capturing devices 103 while observing specific areas in the total area being observed. The specific areas requiring high resolution and capacity can be either predefined or dynamically set. As an example, if the new element detected is not moving, the resolution settings of the plurality of image capturing devices 103 may be reset or auto tuned, to capture a high resolution image of the new element.

FIG. 1b shows an exemplary illustration of intersection of field of views formed by two image capturing devices in accordance with some embodiments of the present disclosure.

As shown in FIG. 1b, both the image capturing devices 103 are rotating about an axis. The total area being observed by both the image capturing devices 103 is represented by 119 and an area of interest for both the image capturing devices 103 is represented by 117. In an embodiment, viewport details corresponding to the area of interest 117 are pre-set by a surveillance device 107. In an embodiment, movements of both the image capturing devices 103 may be synchronized to observe the same area at same time. In an embodiment, synchronization is performed based on the pre-set viewport details associated with the total area 119. The pre-set view port details are translated to the one or more factors i.e. the angle of rotation, zoom level and focal length corresponding to each of the plurality of image capturing devices 103. The surveillance device 107 has access to the pre-set viewport details. The surveillance device 107 may synchronously adjust the one or more factors for each of the plurality of image capturing devices 103 to scan the same area of interest at any given time.

Both the image capturing devices 103 continuously provide viewport details 104 of the area being observed to the surveillance device 107. The exemplary viewport details may be of the form as shown in FIG. 1c. The viewport details for position-1 of first image capturing device 103$_1$ and second image capturing device 103$_2$ is of the form {A11,F11,Z11, A21,F21,Z21} as shown in FIG. 1c. A11, F11 and Z11 correspond to the angle of rotation, focal length and zoom level of the first image capturing device 103$_1$ at the position-1 where, "A" represents Angle of rotation, "F" represents Focus and "Z" represents Zoom level. Similarly, A21, F21 and Z21 correspond to angle of rotation, focus and zoom level of the second image capturing device 103$_2$ at the position-1. The viewport details 104 of both the image capturing devices 103 are compared with the pre-set viewport details of the area of interest 117. If the viewport details 104 of both the image capturing devices 103 matches with the pre-set viewport details of the area of interest 117, then both the image capturing devices 103 are said to be observing the same area of interest 117. The intersection of field of views of both the image capturing devices 103 as shown in the FIG. 1b is the area of interest 117 to be observed. One or more images of the area of interest 117 are captured by both the image capturing devices 103 from their respective positions. Thereafter, the one or more images are provided to the surveillance device 107 and a 3-D model of the area of interest 117 is generated by combining the one or more images. The one or more images are combined using one or more predefined techniques. The generated 3-D model of the area of interest 117 is observed by the surveillance device 107 to detect presence or absence of a new element in the area of interest 117. If the new element is present, movements and intrusions of the new element are tracked and security personnel closest to present position of the new element is alerted to perform one or more actions.

Figure 2:
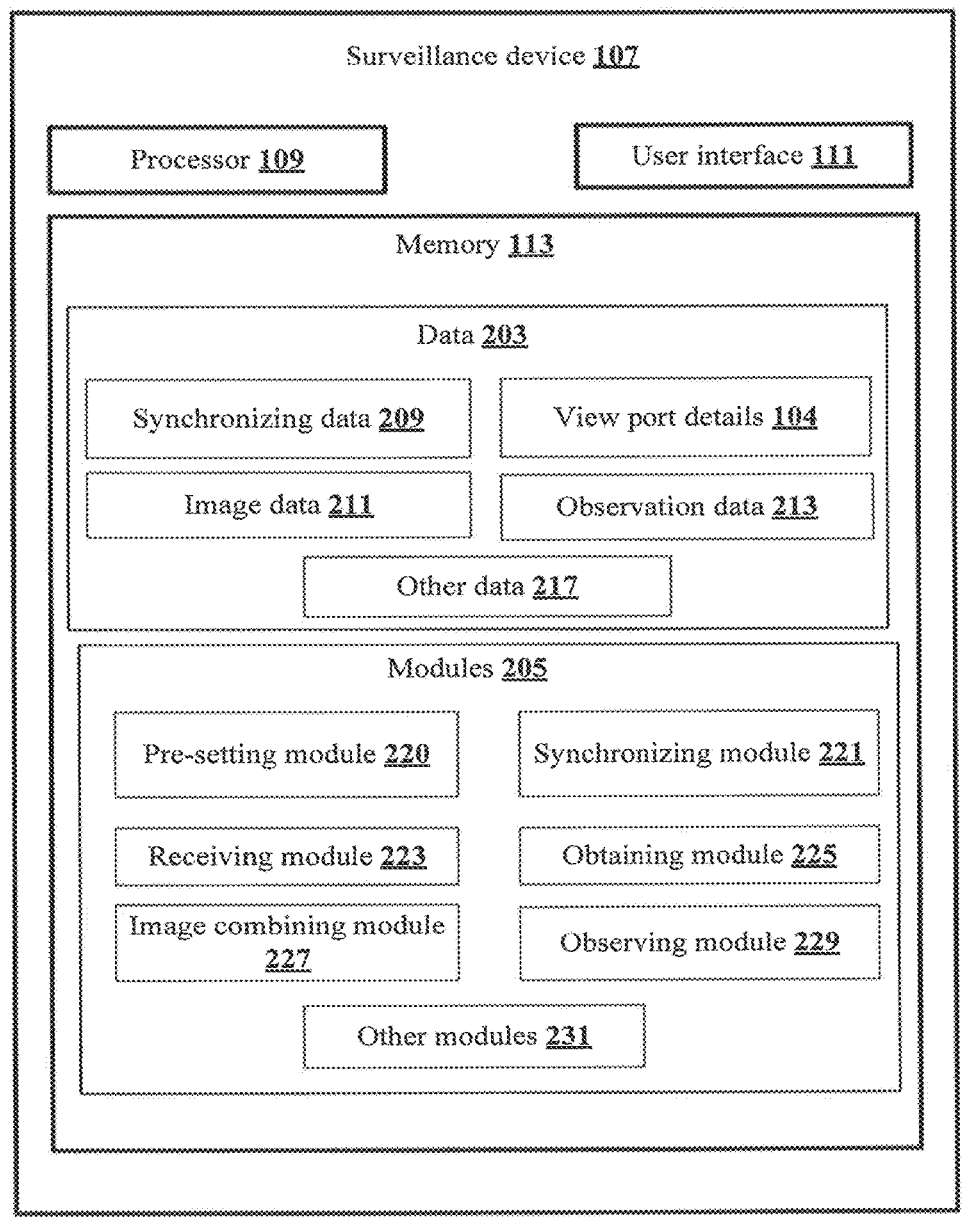
FIG. 2 shows a detailed block diagram of a surveillance device for surveillance of an area of interest in accordance with some embodiments of the present disclosure.

FIG. 2 shows a detailed block diagram of a surveillance device for observing an area of interest in accordance with some embodiments of the present disclosure.

In one implementation, the surveillance device 107 receives data 203 from plurality of image capturing devices 103. As an example, the data 203 may be stored in a memory 113 configured in the surveillance device 107. In one embodiment, data 203 comprises synchronizing data 209, viewport details 104, image data 211, observation data 213 and other data 217. In the illustrated FIG. 2, modules 205 stored in the memory 113 are described herein in detail.

In one embodiment, the data 203 may be stored in the memory 113 in the form of various data structures. Additionally, the aforementioned data 203 can be organized using data models, such as relational or hierarchical data models. The other data 217 may store data, including temporary data and temporary files, generated by modules 205 for performing the various functions of the surveillance device 107.

In one embodiment, the synchronizing data 209 comprises the data required to synchronize plurality of the image capturing devices 103. The plurality of image capturing devices 103, are synchronized to scan same area at same time from the respective positions of each of the plurality of image capturing devices 103. The resolution and capacity of the plurality of image capturing devices 103 can be varied for specific areas in the total area being observed. The specific areas requiring high resolution and capacity can be either predefined or dynamically set.

In one embodiment, the viewport details 104 comprise co-ordinate and pixel details of an area being observed by each of the plurality of image capturing devices 103. The viewport details 104 are continuously received by the surveillance device 107, as the plurality of image capturing devices 103 are rotating about an axis. The viewport details 104 may also provide the information about angle of each of the plurality of image capturing devices 103 corresponding to the respective axis of rotation of each of the plurality of image capturing devices 103.

In one embodiment, the image data 211 comprises one or more images captured by the plurality of image capturing devices 103. The one or more images captured by the plurality of image capturing devices 103 are combined using one or more predefined techniques stored in the memory 113. The one or more images are combined using the one or more predefined techniques to generate a 3-D model of the area of interest.

In one embodiment, the observation data 213 comprises the data required to observe the 3-D model and detect the presence or absence of a new element, in the area of interest. The 3-D model of the area of interest is analysed based on predefined details related to the area of interest, stored in observation data 213. As an example, predefined details may be, living and non-living things supposed to be present in the area of interest, one or more activities considered as suspicious etc.

In an embodiment, the data stored in the memory 113 is processed by the modules 205 of the surveillance device 107. The modules 205 may be stored within the memory 113 as shown in the FIG. 2. In an example, the modules 205, communicatively coupled to the processor 109, may also be outside the memory 113.

In an embodiment, the modules 205 may include, for example, a pre-setting module 220, a synchronizing module 221, a receiving module 223, an obtaining module 225, a generating module 227, an observing module 229 and other modules 231. The other modules 231 may be used to perform various miscellaneous functionalities of the surveillance device 107. It will be appreciated that such aforementioned modules 205 may be represented as a single module or a combination of different modules.

In one embodiment, the pre-setting module 220 pre-sets the area of interest to be captured by the plurality of image capturing devices 103. The area of interest to be captured from total area being observed is pre-set by the surveillance device 107 for each of the plurality of image capturing devices 103. Also, the viewport details of the total area being scanned by plurality of image capturing devices 103 are pre-set to enable the synchronized movement of the plurality of image capturing devices 103. The viewport details of the area of interest are also pre-set by the pre-setting module 220.

In one embodiment, the synchronizing module 221 synchronizes the plurality of image capturing devices 103. The movements of the plurality of image capturing devices 103 may be synchronized by the synchronizing module 221, to scan the same area of interest at the same time. In an embodiment, synchronization is performed based on the pre-set viewport details associated with total area being observed by the plurality of image capturing devices 103. The pre-set view port details are translated to one or more factors i.e. the angle of rotation, zoom level and focal length corresponding to each of the plurality of image capturing devices 103. The surveillance device 107 has access to the pre-set viewport details. The surveillance device 107 may synchronously adjust the one or more factors for each of the plurality of image capturing devices 103 to scan the same area of interest at any given time. In an embodiment, the synchronizing module 221 varies the resolution and compression of the plurality of image capturing devices 103 while scanning the specific areas in the total area.

In one embodiment, the receiving module 223 receives the viewport details 104 from the plurality of image capturing devices 103. The receiving module 223 continuously receives the viewport details 104 corresponding to the area observed by each of the plurality of image capturing devices 103, from each of the plurality of image capturing devices 103.

In one embodiment, the obtaining module 225 obtains the one or more images of the area of interest from the plurality of image capturing devices 103. Each of the plurality of image capturing devices 103 may be observing the same area of interest. The received viewport details 104 of each of the plurality of image capturing devices 103 are compared with the pre-set viewport details of the area of interest. If the received viewport details 104 of each of the plurality of image capturing devices 103 matches with the pre-set viewport details, then each of the plurality of image capturing devices 103 are said to be observing the same area of interest. The area of interest is formed at intersection points of the field of views of each of the plurality of image capturing devices 103. Each of the plurality of image capturing devices 103 captures one or more images at the intersection points i.e. the one or more images of only the area of interest are captured, eliminating rest of the area. The one or more images captured by each of the plurality of image capturing devices 103, are obtained by the obtaining module 225.

In one embodiment, the image combining module 227 generates the 3-D model of the area of interest. The image combining module 227 combines the obtained one or more images using the one or more predefined techniques, to generate 3-D model of the area of interest. As an example, the one or more predefined techniques may include, but not limited to, a technique of estimating dense shape and non-Lambertian photometry.

In one embodiment, the observing module 229 observes the 3-D model. The 3-D model is observed to detect presence or absence of a new element in the area of interest. If the presence of the new element is detected in the area of interest, movements or intrusions of the new element is tracked by the observing module 229. Movement of the new element is tracked by redefining observing path of the plurality of image capturing devices 103. Security personnel proximal to present position of the new element is alerted to perform one or more actions. In an embodiment, the new element is tracked until the new element is inside the area of interest.

Figure 3:
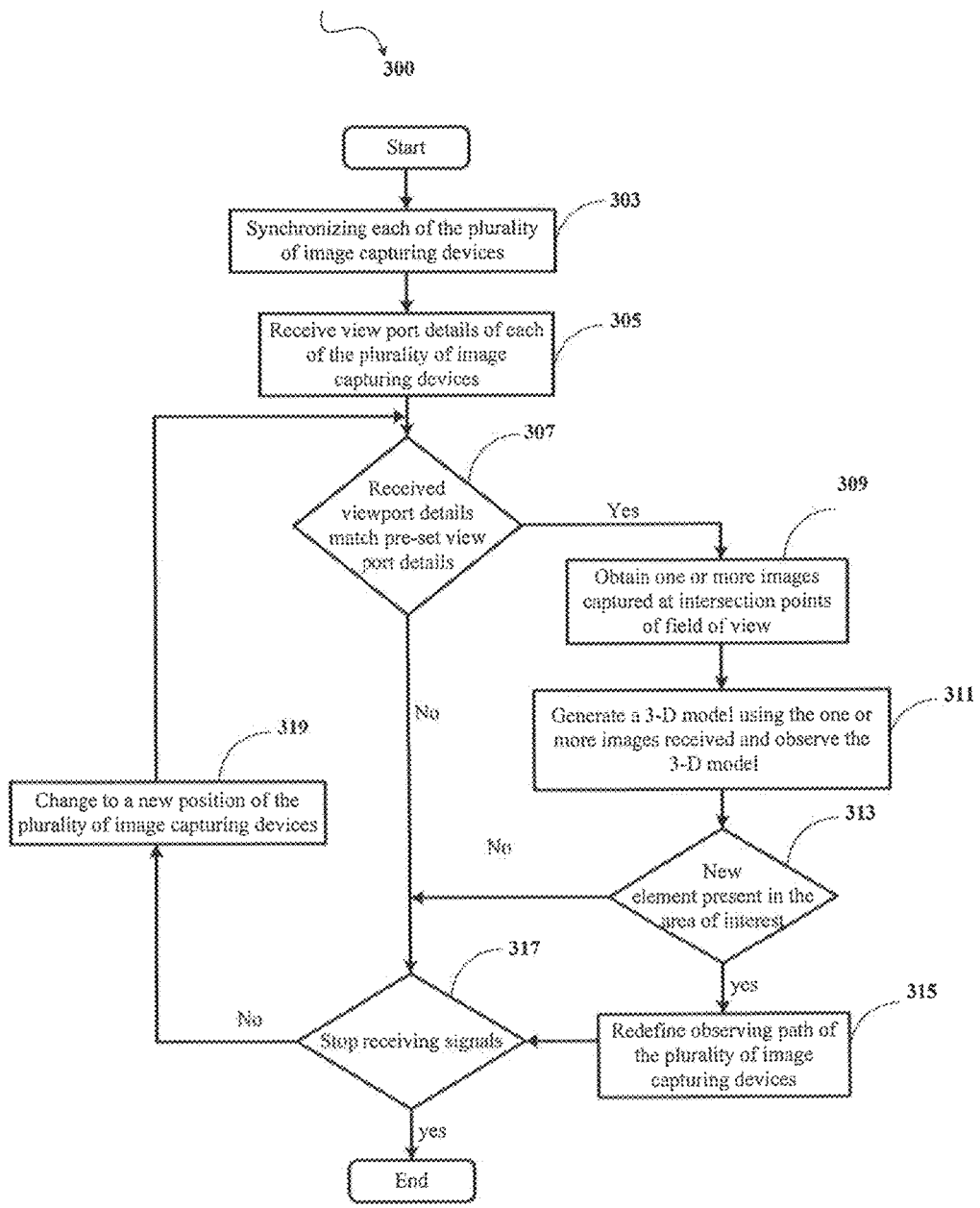
FIG. 3 shows a flowchart illustrating the process for surveillance of an area of interest in accordance with some embodiments of the present disclosure.

FIG. 3 illustrates a flowchart illustrating the process for surveillance of an area of interest in accordance with some embodiments of the present disclosure;

As illustrated in FIG. 3, the method 300 comprises one or more blocks illustrating a method for observing an area of interest. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 303, processor 109 configured in surveillance device 107, synchronizes plurality of image capturing devices 103. The area of interest to be observed from the total area being observed is pre-set by the processor 109 for each of the plurality of image capturing devices 103. The movements of the plurality of image capturing devices 103 may be synchronized by the processor 109 to scan the same area of interest at the same time. In an embodiment, the processor 109 may also vary the resolution and compression of the plurality of image capturing devices 103 while observing specific areas in the total area being observed.

At block 305, the processor 109 receives viewport details 104 from the plurality of image capturing devices 103. The processor 109 continuously receives the viewport details 104 corresponding to the area being observed by each of the plurality of image capturing devices 103.

At block 307, the processor 109 checks whether the received viewport details 104 of each of the plurality of image capturing devices 103 matches with pre-set viewport details.

The received viewport details 104 of each of the plurality of image capturing devices 103 are compared with the pre-set viewport details of the area of interest. If the received viewport details 104 matches with the pre-set viewport details, then the method proceeds to block 309 via "Yes". If the received viewport details 104 do not match with the pre-set viewport details, then the method proceeds to block 317 via "No".

At block 309, each of the plurality of image capturing devices 103 are said to be observing the same area of interest. The processor 109 obtains one or more images of the area of interest formed at intersection points of the field of views of each of the plurality of image capturing devices 103, from each of the plurality of image capturing devices 103. Each of the plurality of image capturing devices 103 captures the one or more images of only the area of interest, eliminating rest of the area. Upon obtaining the images, at block 311, the processor 109 combines the obtained one or more images using one or more predefined techniques, to generate 3-D model of the area of interest.

At block 313, the surveillance device 107 checks for the presence or absence of a new element in the area of interest. If the presence of the new element is detected in the area of interest, the method proceeds to block 315 via "Yes". If the presence of the new element is not detected in the area of interest, the method proceeds to block 317 via "No". At block 315, the movement of the new element is tracked by redefining observing path of the plurality of image capturing devices 103. Security personnel proximal to present position of the new element is alerted to perform one or more actions. In an embodiment, the new element is tracked until the new element is inside the area of interest.

At block 317, the surveillance device 107 checks whether signal related to the viewport details 104 being received, should be stopped. If the signal being received should be stopped, the method ends the process via "Yes". If the signal being received should not be stopped, the method proceeds to block 319 via "No". At block 319, the position of the plurality of image capturing devices 103 are changed. The view port details 104 of the image from the changed position are sent to the surveillance device 107. Upon receiving the viewport details 104 of the image from the changed position, the method loops back to block 307.

Figure 4:
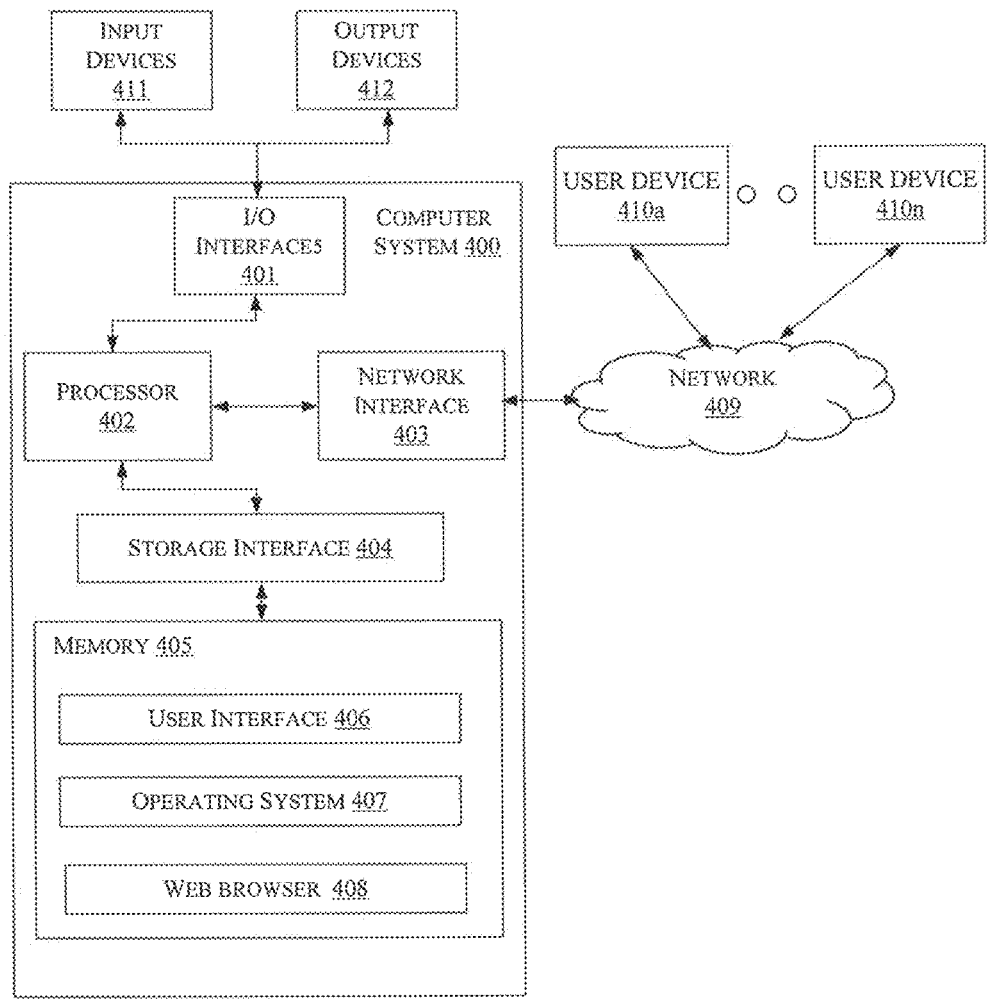
FIG. 4 is a block diagram of an exemplary computer system for implementing embodiments consistent with the present disclosure.

FIG. 4 is a block diagram of an exemplary computer system for implementing embodiments consistent with the present disclosure.

In an embodiment, the computer system 400 is used for surveillance of an area of interest. The computer system 400 may comprise a central processing unit ("CPU" or "processor") 402. The processor 402 may comprise at least one data processor for executing program components for executing user- or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, the computer system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with one or more user devices 410 (a, . . . , n). The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The one or more user devices 410 (a, . . . , n) may include, without limitation, personal computer(s), mobile devices such as cellular telephones, smartphones, tablet computers, eBook readers, laptop computers, notebooks, gaming consoles, or the like.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface application 406, an operating system 407, web server 408 etc. In some embodiments, computer system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/7/8, etc.), Apple iOS, Google Android, Blackberry Operating System (OS), or the like. User interface 406 may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 400 may implement a web browser 408 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Advantages of the embodiment of the present disclosure are illustrated herein.

In an embodiment, the present disclosure provides a method for observing an area of interest.

The present disclosure provides a feature wherein the one or more images of the area of interest captured by the plurality of image capturing devices can be combined to generate a 3-D model of the area of interest. The generated 3-D model of the area of interest is analysed to detect presence or absence of a new element in the area of interest based on pre-set criteria. The 3-D model helps in measuring correct depth of the new element and real size of the new element detected. Also, the 3-D model provides a complete view of the new element along with the area of interest for performing better analysis.

The present disclosure provides a feature wherein movements and intrusions of the new element can be tracked by redefining observing path of the plurality of image capturing devices, upon detecting the presence of the new element.

The present disclosure provides a feature wherein high level accuracy may be achieved in tracking the new elements in the area of interest.

The present disclosure provides a feature wherein high resolution of one or more images of the new element in the area of interest is obtained.

The present disclosure provides a feature wherein the surveillance device alerts security personnel, proximal to present position of the new element, to perform one or more actions.

The present disclosure can be implemented in a fully automated security warning system.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a device a method for observing an area of interest. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

REFERRAL NUMERALS

| Reference Number | Description |
| --- | --- |
| 100 | Architecture |
| 103 | Plurality of image capturing devices |
| 104 | Viewport details |
| 105 | Communication network |
| 107 | Surveillance device |
| 109 | Processor |
| 111 | User interface |
| 113 | Memory |
| 117 | Area of interest |
| 119 | Total area being observed |
| 203 | Data |
| 205 | Modules |
| 209 | Synchronizing Data |
| 211 | Image data |
| 213 | Observation data |
| 217 | Other data |
| 220 | Pre-setting module |
| 221 | Synchronizing module |
| 223 | Receiving module |
| 225 | Obtaining module |
| 227 | Image combining module |
| 229 | Observing module |
| 231 | Other modules |

What is claimed is:

1. A method for surveillance of an area of interest, the method comprising:
   synchronizing, by a surveillance device, a plurality of image capturing devices to observe simultaneously, the area of interest;
   receiving, by the surveillance device, view port details of an area being observed by each of the plurality of image capturing devices;
   obtaining, by the surveillance device, one or more images captured at intersection points of a field of view of the plurality of image capturing devices, when the view port details received from each of the plurality of image capturing devices matches with pre-set view port details of the area of interest;
   generating, by the surveillance device, a 3-D model of the area of interest using the one or more images, received from each of the plurality of image capturing devices, the 3-D model including a plurality of first elements; and
   observing, by the surveillance device, the 3-D model for detecting at least one of a presence of a second element that is not within the plurality of first elements and an absence of at least one of the plurality of first elements, in the area of interest, based on pre-defined details related to the area of interest.

2. The method as claimed in claim 1, wherein the area of interest for each of the plurality of image capturing devices is pre-set by the surveillance device.

3. The method as claimed in claim 1, further comprising tracking, by the surveillance device, at least one of movements and intrusions of the second element, by redefining and observing a path of the plurality of image capturing devices, upon detecting the presence of the second element.

4. The method as claimed in claim 3, further comprising alerting, by the surveillance device, security personnel proximal to present position of the second element, to perform one or more actions.

5. The method as claimed in claim 3, further comprising terminating the tracking of at least one of the movements and the intrusions of the second element, when the second element has moved outside the area of interest.

6. The method as claimed in claim 1, wherein the 3-D model of the area of interest is formed by combining the one or more images obtained from each of the plurality of image capturing devices.

7. The method as claimed in claim 1, wherein the viewport details comprise co-ordinate and pixel details of the area being observed by the plurality of image capturing devices.

8. A surveillance device for surveillance of an area of interest, the surveillance device comprising:
   a processor; and
   a memory communicatively coupled to the processor, wherein the memory stores instructions, which, on execution, causes the processor to:
      synchronize a plurality of image capturing devices to observe simultaneously, the area of interest;
      receive view port details of an area being observed by each of the plurality of image capturing devices;
      obtain one or more images captured at intersection points of a field of view of the plurality of image capturing devices, when the view port details received from each of the plurality of image capturing devices matches with pre-set view port details of the area of interest;
      generate a 3-D model of the area of interest using the one or more images received from each of the plurality of image capturing devices, the 3-D model including a plurality of first elements; and
      observe the 3-D model for detecting at least one of a presence of a second element that is not within the plurality of first elements and an absence of at least one of the plurality of first elements, in the area of interest, based on pre-defined details related to the area of interest.

9. The surveillance device as claimed in claim 8, wherein the processor is further configured to execute the instructions to: pre-set the area of interest for each of the plurality of image capturing devices.

10. The surveillance device as claimed in claim 8, wherein the processor is further configured to execute the instructions to: track at least one of movements and intrusions of the second element, by redefining and observing a path of the plurality of image capturing devices, upon detecting the presence of the second element.

11. The surveillance device as claimed in claim 10, wherein the processor is further configured to execute the instructions to: alert security personnel proximal to present position of the second element, to perform one or more actions.

12. The surveillance device as claimed in claim 10, wherein the processor is further configured to execute the instructions to: terminate tracking of at least one of the movements and the intrusions of the second element, when the second element has moved outside the area of interest.

13. The surveillance device as claimed in claim 8, wherein the processor is further configured to execute the instructions to: combine the one or more images obtained from each of the plurality of image capturing devices to form the 3-D model of the area of interest.

14. The surveillance device as claimed in claim 8, wherein the viewport details comprise co-ordinate and pixel details of the area being observed by the plurality of image capturing devices.

15. A non-transitory computer readable medium including instructions stored thereon that when processed by at least one processor causes a surveillance device to perform operations comprising:
- synchronizing a plurality of image capturing devices to observe simultaneously, an area of interest;
- receiving view port details of an area being observed by each of the plurality of image capturing devices;
- obtaining one or more images captured at intersection points of a field of view of the plurality of image capturing devices, when the view port details received from each of the plurality of image capturing devices matches with pre-set view port details of the area of interest;
- generating a 3-D model of the area of interest using the one or more images received from each of the plurality of image capturing devices, the 3-D model including a plurality of first elements; and
- observing the 3-D model for detecting at least one of a presence of a second element that is not within the plurality of first elements and an absence of at least one of the plurality of first elements, in the area of interest, based on pre-defined details related to the area interest.

* * * * *